US012337326B2

(12) United States Patent
Hunter et al.

(10) Patent No.: US 12,337,326 B2
(45) Date of Patent: *Jun. 24, 2025

(54) SUPPORT FOR TEST DEVICE

(71) Applicant: Regeneron Pharmaceuticals, Inc., Tarrytown, NY (US)

(72) Inventors: Christopher Hunter, Castleton-on-Hudson, NY (US); Steven Davis, East Greenbush, NY (US); Melissa Sher, Castleton-on-Hudson, NY (US); David Vanhoute, Troy, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/472,873

(22) Filed: Sep. 22, 2023

(65) Prior Publication Data

US 2024/0009674 A1 Jan. 11, 2024

Related U.S. Application Data

(63) Continuation of application No. 17/169,049, filed on Feb. 5, 2021, now Pat. No. 11,801,513.

(Continued)

(51) Int. Cl.
*B01L 9/00* (2006.01)

(52) U.S. Cl.
CPC ......... *B01L 9/52* (2013.01); *B01L 2200/0684* (2013.01); *B01L 2300/0809* (2013.01); *B01L 2300/0858* (2013.01)

(58) Field of Classification Search
CPC ........ G16H 10/60; G16H 40/63; G16H 50/20; G16H 50/70; B01L 2200/0684;

(Continued)

(56) References Cited

U.S. PATENT DOCUMENTS

D909,589 S 2/2021 Kohno et al.
D922,603 S 6/2021 Fang et al.

(Continued)

FOREIGN PATENT DOCUMENTS

CN 303561783 S 1/2016
DE 20 2019 106447 U1 12/2019

(Continued)

OTHER PUBLICATIONS

MinION Holder—AidenLab by Zanecrc, https://www.thingiverse.com/thing:3763499 (Jul. 22, 2019).

(Continued)

*Primary Examiner* — Jennifer Wecker
*Assistant Examiner* — Jonathan Bortoli
(74) *Attorney, Agent, or Firm* — Bookoff McAndrews, PLLC

(57) ABSTRACT

A support holder for a test device is disclosed, wherein the holder may include a base having a first plurality of sidewalls having a first length and a second plurality of sidewalls having a second length, wherein the second length is greater than the first length, wherein the plurality of sidewalls define a cavity in the base, the cavity including a surface for receiving a portion of the test device; and a plurality of projections extending away from the base, wherein each projection of the plurality of projections is configured to be associated with a leg portion, and wherein a first sidewall of the first plurality of sidewalls includes a center notch positioned between a first corner portion and a second corner portion, and wherein a second sidewall of the first plurality of sidewalls includes a removable portion configured to cover an opening into an interior of the base.

20 Claims, 5 Drawing Sheets

Related U.S. Application Data

(60) Provisional application No. 62/971,469, filed on Feb. 7, 2020.

(58) Field of Classification Search
CPC ........... B01L 2200/14; B01L 2300/023; B01L 2300/0809; B01L 2300/0816; B01L 2300/0858; B01L 9/52; B01L 9/527
See application file for complete search history.

(56) References Cited

U.S. PATENT DOCUMENTS

| | | | |
|---|---|---|---|
| 2002/0056792 | A1 | 5/2002 | Ibrahim |
| 2003/0024043 | A1 | 2/2003 | Rivera et al. |
| 2003/0138354 | A1 | 7/2003 | Fitzgerald et al. |
| 2013/0009032 | A1 | 1/2013 | Polletta et al. |
| 2016/0096175 | A1 | 4/2016 | Pallas et al. |
| 2017/0052096 | A1 | 2/2017 | McCormick |
| 2018/0029644 | A1 | 2/2018 | Li et al. |

FOREIGN PATENT DOCUMENTS

| | | | |
|---|---|---|---|
| EP | 3 404 420 | A1 | 11/2018 |
| JP | 2008-216235 | A | 9/2008 |
| WO | 2019/202070 | A1 | 10/2019 |

OTHER PUBLICATIONS

MinION Stand by Amandatron, https://www.thingiverse.com/thing:3957561 (Nov. 5, 2019).
Oxford Nanopore Technologies, MinION Sequencer, https://nanoporetech.com/products/minion# (2008).
International Search Report in PCT/US2021/016902, dated Jul. 9, 2021, 8 pages.

SUPPORT FOR TEST DEVICE

CROSS-REFERENCE TO RELATED APPLICATIONS

This application is a continuation of U.S. application Ser. No. 17/169,049, filed Feb. 5, 2021, which claims the benefit of priority from U.S. Provisional Application No. 62/971,469, filed Feb. 7, 2020, the entireties of which are incorporated herein by reference.

TECHNICAL FIELD

This disclosure is directed to a support holder for a test device and uses thereof.

INTRODUCTION

Test devices, such as DNA and RNA sequencers, are used in laboratory settings to perform real time analyses. One such test device is the MinION sequencer (Oxford Nanopore Technologies, https://nanoporetech.com/products/minion, incorporated by reference herein), a portable, real-time device for DNA and RNA sequencing. While such DNA and RNA sequences provide many beneficial uses, they may be small and may easily be knocked over when used on a laboratory table, desk, etc. Even minor disturbances may impact the results produced from a test device. For example, slight movement of the test device or the surface on which the test device is placed may impair the results or destroy a test sample completely. To ensure accurate testing and analysis of samples, test devices should be isolated from external factors for the entire testing duration, which can range from hours to days.

SUMMARY OF THE DISCLOSURE

In one aspect, the present disclosure describes a support holder for a test device, the support holder comprising a base having a first plurality of sidewalls having a first length and a second plurality of sidewalls having a second length, wherein the second length is greater than the first length, wherein the first plurality of sidewalls and the second plurality of second sidewalls define a cavity in the base, wherein the cavity includes a surface for receiving a portion of the test device. The support holder may further include a plurality of projections extending away from the base, wherein a first pair of projections of the plurality of projections extends from one sidewall of the second plurality of sidewalls and a second pair of projections of the plurality of projections extends from another sidewall of the second plurality of sidewalls, wherein each projection of the plurality of projections is configured to be associated with a leg portion, and wherein a first sidewall of the first plurality of sidewalls includes a center notch positioned between a first corner portion and a second corner portion, and wherein a second sidewall of the first plurality of sidewalls includes a removable portion configured to cover an opening into an interior of the base.

Various embodiments of the support holder may include one or more of the following aspects. The opening of the support holder may extend at least partially through the interior of the base, from the first sidewall of the first plurality of sidewalls to the second sidewall of the first plurality of sidewalls. Each projection of the plurality of projections may include a housing for receiving the leg portion. The leg portion may include a nonslip material. The first length of the first plurality of sidewalls may range from about 20 mm to about 50 mm. The second length of the second plurality of sidewalls may range from about 90 mm to about 130 mm. The sidewalls may have a thickness ranging from about 6 mm to about 8 mm. The sidewalls may have a height ranging from about 20 mm to about 30 mm. The first corner portion and the second corner portion may each have a height about 5 mm greater than a height of the second plurality of sidewalls. The surface may include a cavity in fluid communication with a plurality of air vents. Each projection of the plurality of projections may include a neck portion having a first height and the leg portion having a second height, wherein the second height is greater than the first height, and the neck portion is disposed between the leg portion and the base. The center notch may have a length ranging from about 15 mm to about 20 mm.

In another aspect, the present disclosure describes a support holder for a test device, the support holder comprising a base having a first plurality of sidewalls having a first length and a second plurality of sidewalls having a second length, wherein the second length is greater than the first length, wherein the first plurality of sidewalls and the second plurality of second sidewalls define a cavity in the base, wherein the cavity includes a surface for receiving a portion of the test device. The support holder may further include a plurality of projections extending away from the base, wherein a first pair of projections of the plurality of projections extends from one sidewall of the second plurality of sidewalls and a second pair of projections of the plurality of projections extends from another sidewall of the second plurality of sidewalls, wherein each projection of the plurality of projections is configured to be associated with a leg portion; wherein each projection of the plurality of projections comprises a housing for receiving the leg portion, a neck portion having a first height, and leg portion having a second height, wherein the second height is greater than the first height.

Various embodiments of the support holder may include one or more of the following aspects. A first sidewall of the first plurality of sidewalls may include a center notch positioned between a first corner portion and a second corner portion. A second sidewall of the first plurality of sidewalls may include a removable portion configured to cover an opening into an interior of the base. The opening may extend at least partially through the interior of the base, from the first sidewall of the first plurality of sidewalls to the second sidewall of the first plurality of sidewalls. A weighted insert may be disposed in the interior of the base. The first length of the first plurality of sidewalls may range from about 20 mm to about 50 mm. The second length of the second plurality of sidewalls may range from about 90 mm to about 130 mm. Each sidewall of the second plurality of sidewalls may include an air vent.

BRIEF DESCRIPTION OF THE FIGURES

The accompanying drawings, which are incorporated in and constitute a part of this specification, illustrate various examples and, together with the description, serve to explain the principles of the disclosed examples and embodiments.

Aspects of the disclosure may be implemented in connection with embodiments illustrated in the attached drawings. These drawings show different aspects of the present disclosure and, where appropriate, reference numerals illustrating like structures, components, materials, and/or elements in different figures are labeled similarly. It is understood that various combinations of the structures, components, and/or elements, other than those specifically shown, are contemplated and are within the scope of the present disclosure.

Moreover, there are many embodiments described and illustrated herein. The present disclosure is neither limited to any single aspect or embodiment thereof, nor is it limited to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein. Notably, an embodiment or implementation described herein as "exemplary" is not to be construed as preferred or advantageous, for example, over other embodiments or implementations; rather, it is intended to reflect or indicate the embodiment(s) is/are "example" embodiment(s).

Figure 1:
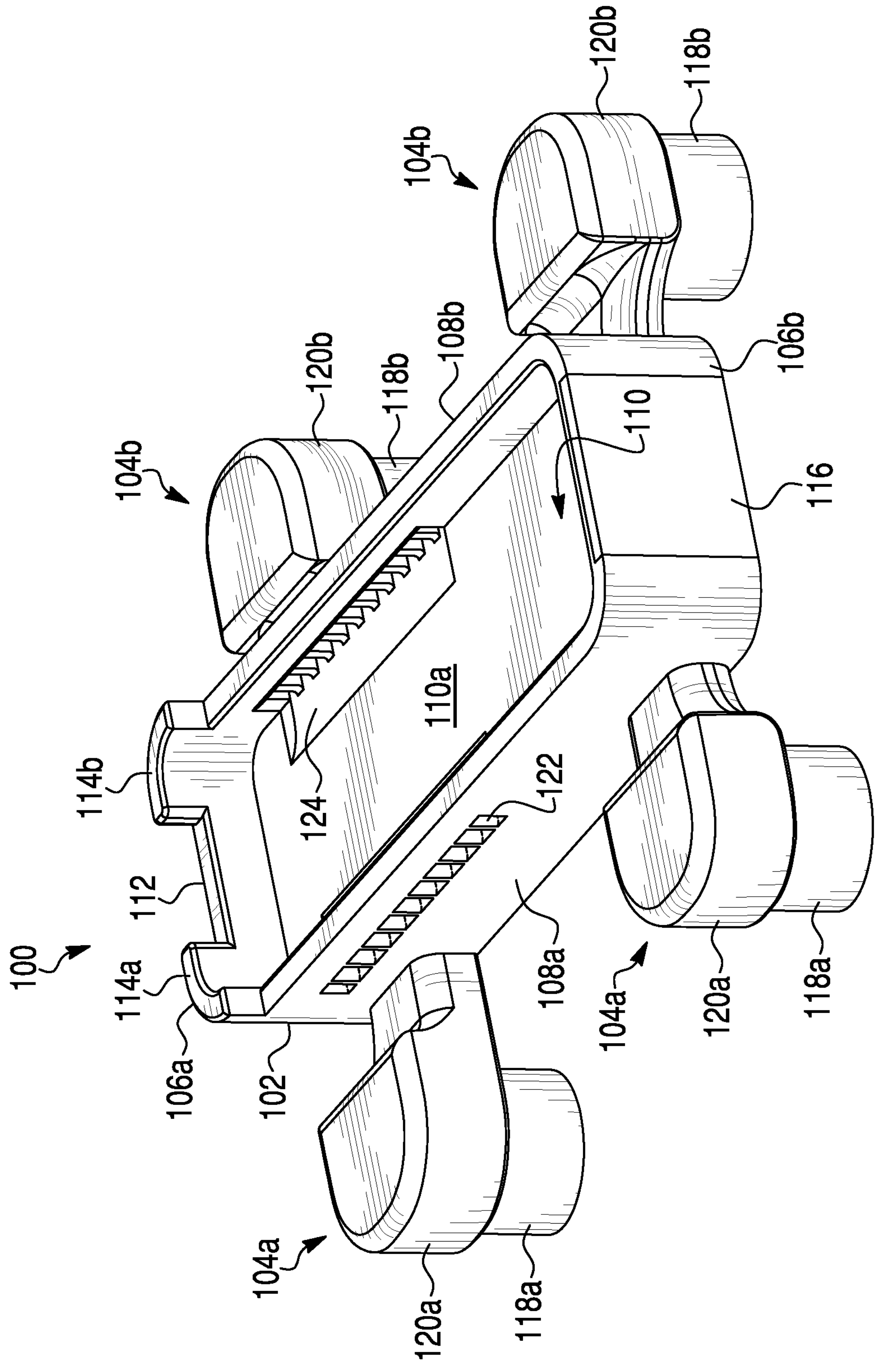

FIG. 1 is a perspective view of the support, according to an embodiment of the present disclosure.

Figure 2:
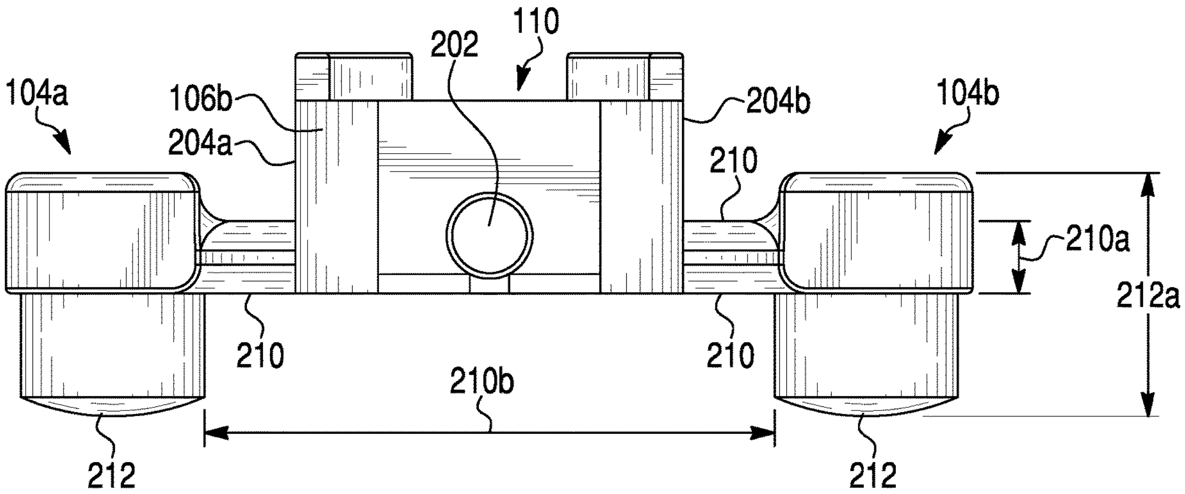

FIG. 2 is a first elevation view of the support, according to an embodiment of the present disclosure.

Figure 3:
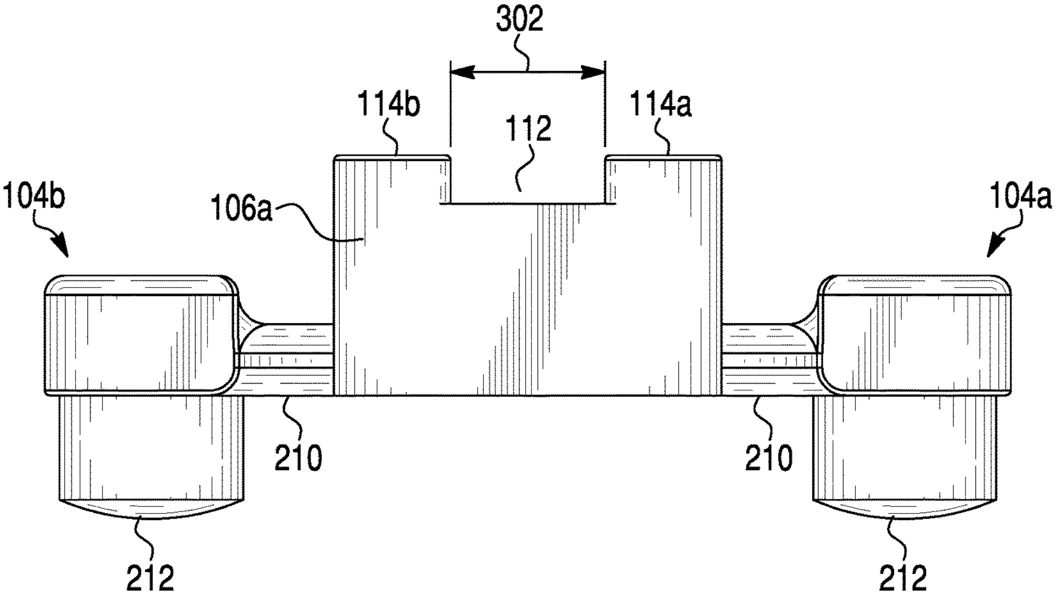

FIG. 3 is a second elevation view of the support, according to an embodiment of the present disclosure.

Figure 4:
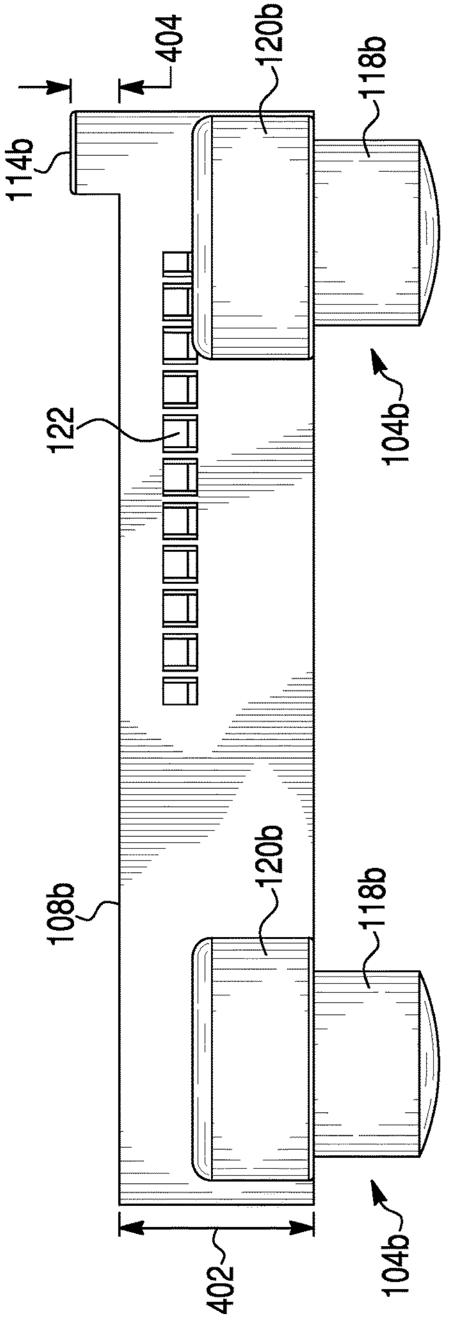

FIG. 4 is a first side view of the support, according to an embodiment of the present disclosure.

Figure 5:
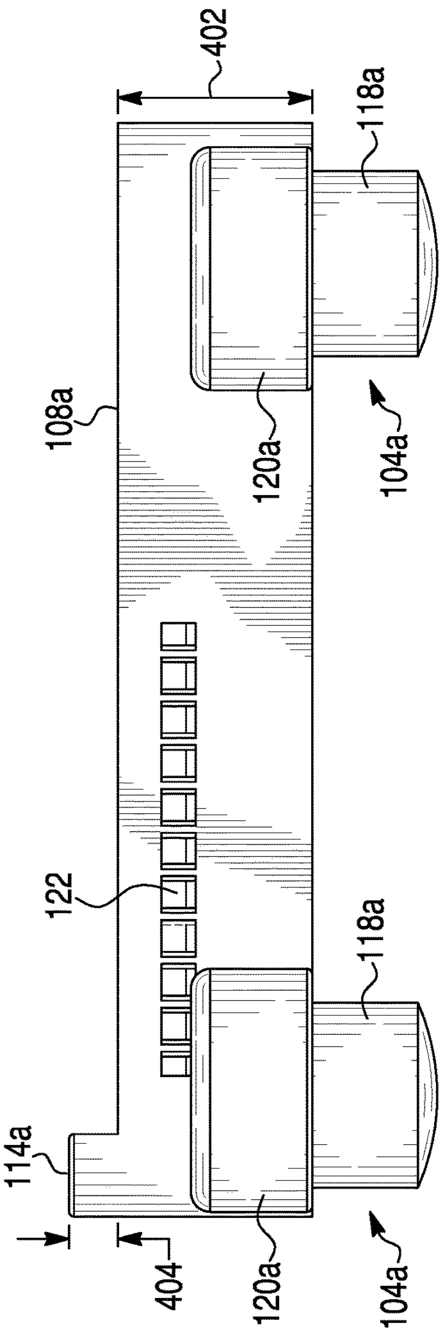

FIG. 5 is a second side view of the support, according to an embodiment of the present disclosure.

Figure 6:
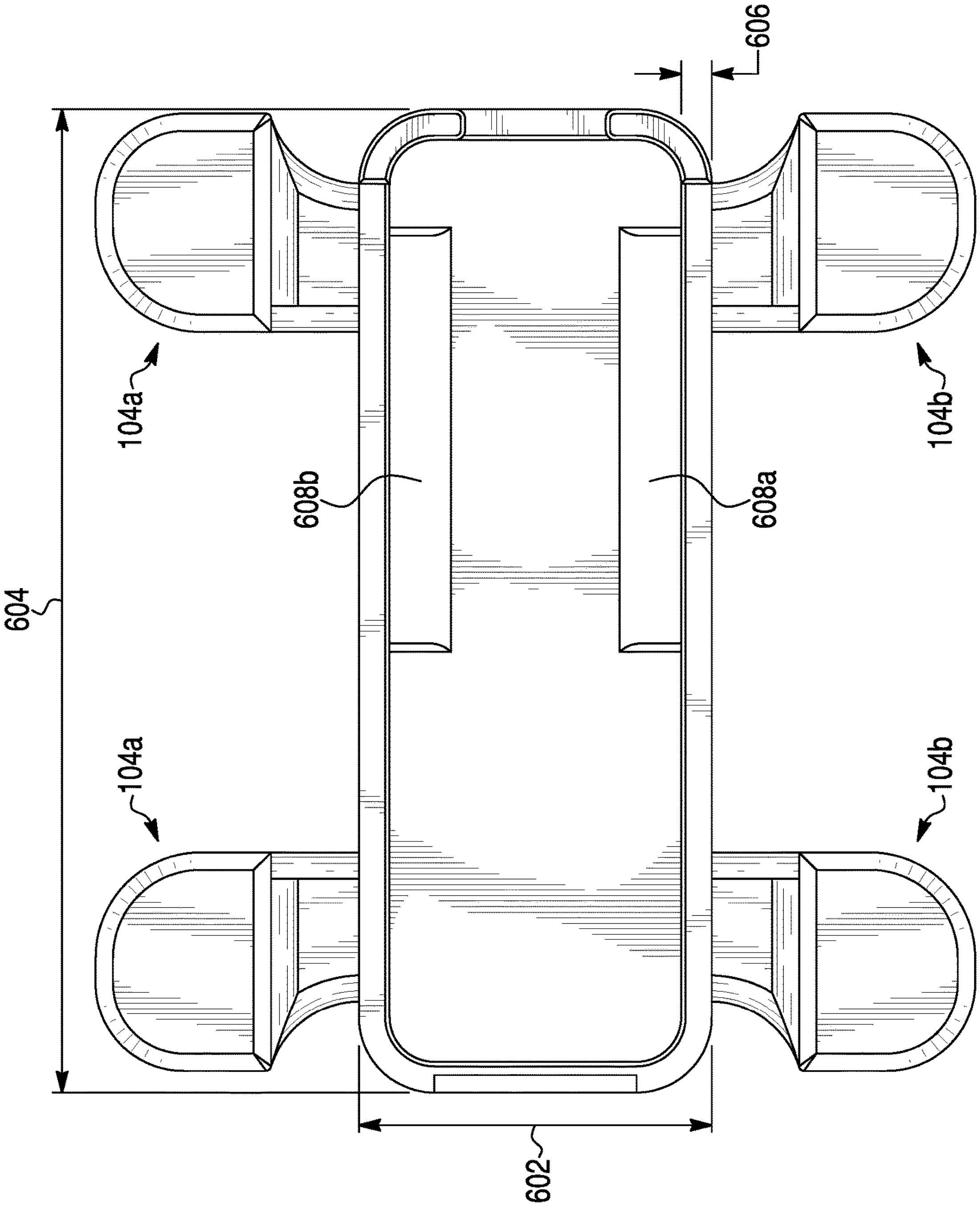

FIG. 6 is a top view of the support, according to an embodiment of the present disclosure.

Figure 7:
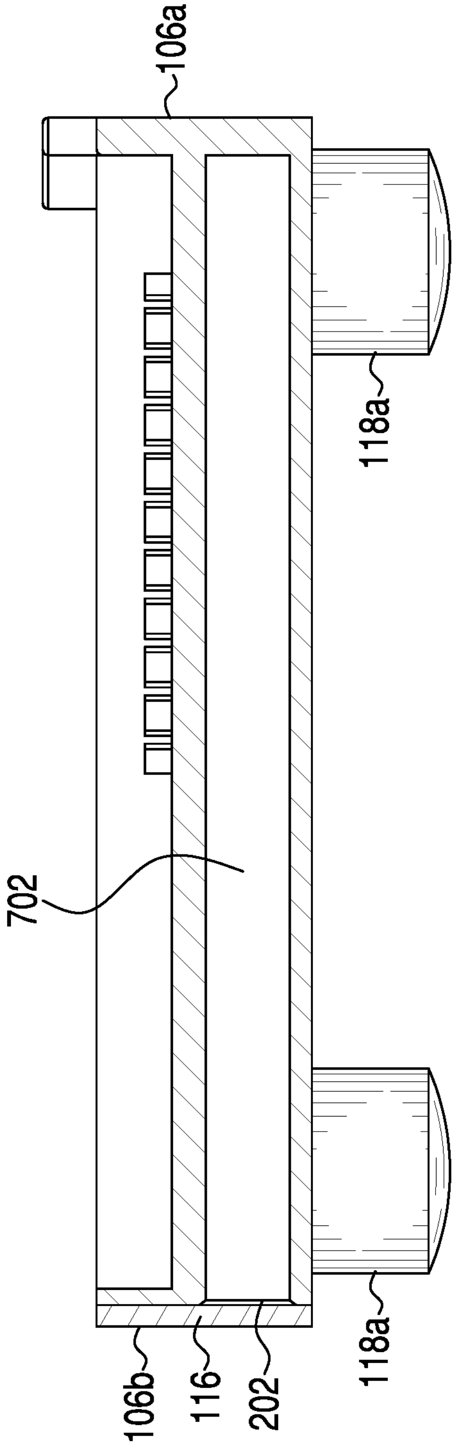

FIG. 7 is a cross-sectional view of the support, according to an embodiment of the present disclosure.

As used herein, the terms "comprises," "comprising," "includes," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." In addition, the terms "first," "second," and the like, herein do not denote any order, quantity, or importance, but rather are used to distinguish an element or a structure from another. Moreover, the terms "a" and "an" herein do not denote a limitation of quantity, but rather denote the presence of one or more of the referenced items.

Notably, for simplicity and clarity of illustration, certain aspects of the figures depict the general structure and/or manner of construction of the various embodiments. Descriptions and details of well-known features and techniques may be omitted to avoid unnecessarily obscuring other features. Elements in the figures are not necessarily drawn to scale; the dimensions of some features may be exaggerated relative to other elements to improve understanding of the example embodiments. For example, one of ordinary skill in the art appreciates that the side views are not drawn to scale and should not be viewed as representing proportional relationships between different components. The sides views are provided to help illustrate the various components of the depicted assembly, and to show their relative positioning to one another.

DETAILED DESCRIPTION

Reference will now be made in detail to examples of the present disclosure, which are illustrated in the accompanying drawings. Wherever possible, the same reference numbers will be used throughout the drawings to refer to the same or like parts. In the discussion that follows, relative terms such as "about," "substantially," "approximately," etc. are used to indicate a possible variation of ±10% in a stated numeric value.

As described above, existing test devices require stable environments free from external disturbances, e.g., vibrations and/or movements caused by users. As detailed on their website, https://nanoporetech.com/products/minion#, the MinION sequencer, (Oxford Nanopore Technologies) weighs under 100 g and plugs into a PC or laptop using, for example, a high-speed USB 3.0 cable for real-time analyses.

Because of the configuration of such test devices, which may be light in weight and have both a top and bottom surface that is flat and smooth, such devices may easily slide around and/or off surfaces, such as tables or laboratory benches. The test devices use fluid samples and require fluidics, such that slight movements may impact the test devices, samples, and/or results. Movements and any ensuing vibrations from such movements, e.g., a user accidentally bumping into a table holding the device, may cause the samples to shift, producing errors in the testing procedure and results thereof. Testing durations may range from minutes to hours to days, and the user(s) may have to continuously oversee the device to make sure it is not disrupted. When an error occurs, any samples may be contaminated or no longer usable in the device. The user(s) may then have to recollect samples and rerun the tests, which impacts efficiency.

Test devices, e.g., the MinION sequencer, require heat from an external source. Heat may be provided from an external computing device, e.g., a computer or laptop. A USB cord may connect the test device to a laptop to heat the test device. Since the external computing device produces a small amount of heat, it may be difficult to heat and maintain a temperature of the test device. As discussed above, test devices may be placed on a laboratory bench, and laboratories may be kept at low temperatures, e.g., 63° F. to 65° F. These factors may impact the temperature of the test devices. For example, it may take a long duration of time to heat up a test device, and throughout the testing, the temperature may fluctuate due to the cool temperature of the laboratory bench.

The liquid samples are loaded into the test device once it is heated to an adequate temperature. To maintain the temperature of the test device, the USB cord connects the test device and laptop during loading of the samples and throughout the testing duration. However, it may be difficult to load the test device while it is connected with the USB cord, since the test device can easily slide around. The user may have to hold the test device steady, while opening a lid of the test device to expose the loading areas and then load the samples. During this loading step and throughout the test duration, external forces, e.g., human error, movement of the test device, may cause the USB cord connection to loosen.

Accordingly, the present disclosure is directed to various embodiments of a support holder that holds the device with adequate stability, and/or that provides a steady surface for test devices and protects the test devices throughout the entire testing duration.

Embodiments of the present disclosure relate to a support holder, and, in particular, to a support holder for a test device (e.g., sequencer). In some embodiments, the support holder may be configured to include a weighted insert (not shown in the figures). For example, the weighted insert may be inserted into an interior area of the support holder. The test device may be placed on top of the support holder, such that the weighted insert is directly below the test device. Since conventional test devices are usually lightweight, as mentioned above, the use of a weighted insert may counteract the light weight of the test device. By counteracting the lightweight test device, the weighted insert may help to prevent the support holder, and accordingly, the entire combination of the support holder, test device, and sample, from sliding around and/or tipping over.

In another embodiment of the present disclosure, the support holder may include projections extending away from, and supporting, the base. These projections increase the width of the support holder and may allow the weight of the test device to be evenly distributed across the support holder. These projections may also include nonslip material, e.g., on an underside of each projection, to further prevent the support holder from shifting due to movement and to prevent heat loss by maintaining a space between the test device and a laboratory surface the support holder is placed on, e.g., a laboratory bench. To use the support holder, a user may place a test device on a base of the support holder, and place a weighted insert into an interior of the base. Alternatively, a weighted insert may be pre-positioned into the interior of the base, or formed as a part of the base. The user may then configure the test device, as they normally would, to begin testing. For example, the test device may include a USB port that a user may connect to an external computing device, e.g., a laptop or desktop computer, to heat the test device, as described above. The user may then run the necessary tests while the test device is supported and protected by the support holder.

FIG. 1 shows a perspective view of a support holder 100 for a test device. Support holder 100 may be designed to contain any known test device, such as a DNA/RNA sequencer. Support holder 100 may include a base 102 and projections 104*a*, 104*b*. Support holder 100 may be formed of any suitable material with sufficient weight to aid in the stability of the test device, and/or with any characteristics suitable for use in a laboratory setting. For example, support holder 100 may be made from a nylon carbon fiber material and/or other chemically resistant materials. Projections 104 may be made from, or may include, any natural or synthetic nonslip material, for example, rubber materials, e.g., neoprene, and/or plastic materials, e.g., polyvinyl chloride.

Base 102 may include a first plurality of sidewalls 106*a*, 106*b* and a second plurality of sidewalls 108*a*, 108*b*. First plurality of sidewalls 106*a*, 106*b* and second plurality of sidewalls 108*a*, 108*b* may define a cavity 110 in base 102. Cavity 110 may be configured to include a surface 110*a* for receiving a portion of a test device. Cavity 110 may be of any suitable size and/or shape so as to contain a portion of a test device. A test device should accurately fit in cavity 110 such that the test device is stable and secured. For example, cavity 110 and test device may have a fit such that there is limited space or no space between the exterior of the test device and sidewalls 106*a*, 106*b*, 108*a*, 108*b*. For example, cavity 110 and test device may have a transition fixed fit, wherein there may be a negligible clearance between the exterior of the test device and sidewalls 106*a*, 106*b*, 108*a*, 108*b*, or a small interference fit whereby the test device and base 102 can be assembled or disassembled with light pressing force. In FIG. 1, cavity 110 has a substantially rectangular shape. In other embodiments, however, cavity 110 may be substantially square, oval, or any other suitable shape, so long as cavity 110 defines a space large enough to contain a portion of the test device. Further, base 102 may have rounded or sharp corners and/or edges. Surface 110*a* may be substantially flat to allow a test device to be placed evenly on surface 110*a*. In other embodiments, surface 110*a* may be any suitable shape so long as a test device could properly fit on surface 110*a* and in cavity 110.

In some embodiments, first plurality of sidewalls 106*a*, 106*b* may have a first length 602 (shown in FIG. 6), wherein first length 602 may range from about 20 mm to about 50 mm. For example, first length 602 may range from about 25 mm to about 45 mm, or from about mm to about 40 mm. For example, first length 602 may be about 50 mm, about 45 mm, about mm, about 35 mm, or about 30 mm. In at least one example, first length 602 may be between about 40 mm and about 41 mm, such as 40.15 mm. In some embodiments, second plurality of sidewalls 108*a*, 108*b* have a second length 604 (shown in FIG. 6), wherein second length 604 may range from about 90 mm to about 130 mm. For example, second length 604 may range from about 95 mm to about 125 mm, or from about 100 mm to about 120 mm. For example, second length 604 may be about 130 mm, about 125 mm, about 120 mm, about 115 mm, about 110 mm, about 105 mm, or about 100 mm. In at least one example, second length 604 may be between about 112 mm and about 113 mm, such as 112.45 mm. In some embodiments of the present disclosure, second length 604 may be greater than first length 602.

In some embodiments, sidewalls 106*a*, 106*b*, 108*a*, and 108*b*, may have a thickness 606 (shown in FIG. 6) ranging from about 6.0 mm to about 8.0 mm. For example, thickness 606 may range from about 6.2 mm to about 7.5 mm or from about 6.4 mm to about 7.0 mm. In at least one example, thickness 606 may be between about 6.4 mm and about 6.5 mm, such as 6.49 mm. In some embodiments, sidewalls 106*a*, 106*b*, 108*a*, and 108*b*, may have a height 402 (shown in FIG. 4) ranging from about 20 mm to about 30 mm. For example, height 402 may range from about 22 mm to about 28 mm or from about 24 mm to about 26 mm. For example, height 402 may be about 20 mm, about 21 mm, about 22 mm, about 23 mm, about 24 mm, about 25 mm, about 26 mm, about 27 mm, about 28 mm, about 29 mm, or about 30 mm. In at least one example, height 402 may be 25 mm. While various exemplary dimensions for support holder 100 are described herein, it is to be understood that support holder 100 may have any suitable dimension for holding and supporting a test device, and/or for meeting other goal(s) of the present disclosure.

Support holder 100 may include a plurality of projections 104*a*, 104*b*, which may extend away from base 102, which may increase an overall width of support holder 100. The use of projections 104*a*, 104*b* and the wide footing of support holder 100 may increase the stability of support holder 100. For example, when a test device is placed atop cavity 110, the weight of the test device may be more evenly distributed across an entirety of support holder 100 because of the wider footing of support holder 100 due to the projections. Projections 104*a*, 104*b* may also elevate base 102 and the test device above a surface, e.g., a laboratory bench. As discussed above, the cool temperature of the laboratory bench may impact the temperature of the test device. By elevating the test device and creating a gap between the test device and the laboratory bench, the test device may heat up faster and be able to maintain the desired temperature. This may increase efficiency throughout the testing duration, as temperature fluctuations may negatively impact the samples and testing results.

The number of projections may vary, so long as support holder 100 is steady and any weight placed on support holder 100 is evenly distributed. As shown in FIG. 1, base 102 may include a first pair of projections 104*a* and a second pair of projections 104*b*, wherein first pair of projections 104*a* may extend from one sidewall of second plurality of sidewalls 108*a* and second pair of projections 104*b* may extend from another sidewall of second plurality of sidewalls 108*b*.

Referring to FIG. 1, each projection 104*a*, 104*b* may include a housing 120*a*, 120*b* to include a leg portion 118*a*, 118*b*. As shown in the figures, each housing may be configured to receive its corresponding leg portion. Leg portions 118*a*, 118*b* may extend in a downwards direction and may provide support and stability for support holder 100. When support holder 100 is placed on a surface, leg portions 118*a*, 118*b* may be in direct contact with a surface of a table or bench. Leg portion(s) 118*a*, 118*b*, may also prevent heat loss, as contact between the test device and laboratory surface may impact the temperature of the test device, as discussed above. Leg portions 118*a*, 118*b* may include any natural or synthetic nonslip material, for example, rubber materials, e.g., neoprene, and/or or plastic materials, e.g., polyvinyl chloride. The materials and position of leg portion(s) 118*a*, 118*b* may prevent support holder 100 from sliding around and/or off of a surface, and as such may protect the test device from vibrations and/or movements. The materials of leg portion(s) 118*a*, 118*b*, may also help maintain the temperature of the test device. Leg portion(s) 118*a*, 118*b* may be any appropriate shape to be received in housing 120*a*, 120*b* and to provide steadiness and stability to support holder 100.

Referring to FIG. 2, each projection 104*a*, 104*b* may include a neck portion 210 and a leg portion 212. Neck portion(s) 210 may be disposed between leg portion(s) 212 and base 102. For example, and as shown in the figures, neck portion(s) 210 may be configured to connect leg portion(s) 212 to base 102. Neck portion(s) 210 may have a flat surface and may extend from base to leg portion(s) 212. Neck portion(s) 210 may have a first height 210*a* and leg portion(s) 212 may have a second height 212*a*. In some embodiments of the present disclosure, second height 212*a* may be greater than first height 210*a*. In alternative embodiments of the present disclosure, first height 210*a* may be equal to second height 212*a*. First height 210*a* may range from about 1 mm to about 5 mm. For example, first height 210*a* may be about 1 mm, about 2 mm, about 3 mm, about 4 mm, or about 5 mm. In at least one example, first height 210*a* may be 3 mm. Second height 212*a* may range from about 1 mm to about 10 mm. For example, second height 212*a* may be about 1 mm, about 2 mm, about 3 mm, about 4 mm, about 5 mm, about 6 mm, about 7 mm, about 8 mm, about 9 mm, or about 10 mm. A length 210*b* between an outermost edge of neck portion(s) 210, from a point of view facing one of first plurality of sidewalls 106*a*, 106*b* (sidewall 106*b* is shown in FIG. 2) may range from about 50 mm to about mm. For example, length 210*b* may range from about 55 mm to about 65 mm or from about 58 mm to about 62 mm. For example, length 210*b* may be about 55 mm, about 56 mm, about 57 mm, about 58 mm, about 59 mm, about 60 mm, about 61 mm, about 62 mm, about 63 mm, about 64 mm, or about 65 mm. In at least one example, length 210*b* may be between about 59 mm and about 60 mm, such as 59.10 mm.

Referring to FIG. 3, first sidewall 106*a* of first plurality of sidewalls 106*a*, 106*b* may include a center notch 112 positioned between first corner portion 114*a* and second corner portion 114*b*. Center notch 112 may serve as an opening to allow a test device atop, within, or partially within base 102 to connect to an external device, e.g., a computer. For example, a test device may require a cable for connecting to a computer or laptop. When a test device is placed into cavity 110 of base 102, center notch 112 may be configured so that a cable may pass through center notch 112 and contact the test device. Center notch 112 may allow a cable to pass through it and contact the test device such that the test device may fit snugly/appropriately into cavity 110.

As shown in FIG. 3, center notch 112 may have any suitable shape to allow for proper connection of a test device to a cable or cord, e.g., a data or power cord, such as a USB cord. Center notch 112 may also serve as a reinforcement for the USB cord, and/or for a connection between the USB cord and a test device. A test device may be placed atop surface 110*a* of base 102, such that a USB cord may be placed through notch 112. As discussed above, the USB cord may serve as a connection between the test device and an external computing device, e.g., a laptop. Center notch 112 may prevent loosening of the USB cord connection during loading of the samples and throughout the testing duration.

In some embodiments, center notch 112 may have a length 302 ranging from about 15 mm to about 20 mm. For example, center notch 112 may have length 302 of about 15 mm, about 16 mm, about 17 mm, about 18 mm, about 19 mm, or about 20 mm. In at least one example, center notch 112 may have a length 302 of between about 16 mm and about 17 mm, such as 16.10 mm. Center notch 112 may be positioned in between first corner portion 114*a* and second corner portion 114*b*. In some embodiments, center notch 112 may be centered between first corner portion 114*a* and second corner portion 114*b*; in other embodiments, center notch 112 may be offset from a central position. In further embodiments, center notch 112 may be replaced with an opening passing through a sidewall, such as first sidewall 106*a* of the plurality of sidewalls.

First corner portion 114*a* and second corner portion 114*b* may extend in a direction away from base 102, such as upwards from base 102. As shown in FIGS. 4 and 5, first corner portion 114*a* and second corner portion 114*b* may each have a height 404 greater than a height 402 of second plurality of sidewalls 108*a*, 108*b*. In some embodiments, corner portions 114*a*, 114*b* may have a height up to 10 mm greater than a height of second plurality of sidewalls 108*a*, 108*b*. For example, corner portions 114*a*, 114*b* may have a height about 1 mm, about 2 mm, about 3 mm, about 4 mm, about 5 mm, about 6 mm, about 7 mm, about 8 mm, about 9 mm, or about 10 mm, greater than a height of second plurality of sidewalls 108*a*, 108*b*. Corner portions 114*a*, 114*b* may have any suitable shape to properly fit a test device. In at least one embodiment, and as shown in FIG. 1, corner portions 114*a*, 114*b* may have a curved shape.

Referring again to FIG. 1, second sidewall 106*b* of the first plurality of sidewalls may include a removable portion 116. Removable portion 116 may be configured to cover an opening 202 (FIG. 2) into an interior 702 (FIG. 7) of base 102. For example, removable portion 116 may be completely removable from base 102. In other words, when a user wants to expose opening 202, removable portion 116 may be removed from base 102 (as shown in FIG. 2). Alternatively, removable portion 116 may slide to expose opening 202, e.g., removable portion 116 may slide in an upwards direction or downwards direction, such that removable portion 116 may remain attached to base 102, while opening 202 is exposed. In another example, removable portion 116 may simply fold open to expose opening 202, e.g., removable portion 116 may have a hinge that would allow it to fold open.

Referring to FIG. 2, opening 202 may be between corner portions 204*a*, 204*b*. Opening 202 may allow for the placement of a weighted insert (not shown). Opening 202 may be any suitable shape configured to allow for insertion of the weighted insert into interior 702 (depicted in FIG. 7) of base 102. Opening 202 may have a substantially circular shape or a substantially rectangular shape, or any other suitable shape. FIG. 2 shows an exemplary opening 202 in a substantially circular shape. Opening 202 may extend at least partially through interior 702 of base 102 (as shown in FIG. 7). In at least one example, opening 202 may extend from first sidewall 106*a* to second sidewall 106*b*. In embodiments where opening 202 may extend from first sidewall 106*a* to second sidewall 106*b*, interior 702 may be empty (i.e., hollow). A weighted insert, as described below, may be inserted into interior 702. Alternatively, a weighted insert may be pre-positioned into the interior of the base, or formed as a part of the base.

As described above, the weighted insert (not shown in the figures) may counteract the light weight of a test device. The weighted insert may have any suitable weight such that the weighted insert may be properly placed through opening 202 and into interior 702. The weighted insert may have a weight greater than or equal to about 0.10 pounds. For example, the weight of the weighted insert may be greater than or equal to about 0.12 pounds, about 0.15 pounds, or about 0.20 pounds. In at least one example, the weight of the weighted insert may be between about 0.20 and about 0.30 pounds, such as between about 0.20 and about 0.25 pounds. The weighted insert may have any shape suitably configured to fit into opening 202 and interior 702. In some embodiments, for example, the weighted insert may have a substantially square shape or a substantially rectangular shape. In at least one example, the weighted insert may have a rod-like shape. The weighted insert may be formed of any suitable material with appropriate density and resistance to corrosion. Suitable materials may have a high density. Additionally, suitable materials may be resistant to corrosion, toxicity, and contamination. For example, the weighted insert may be formed of stainless steel, sand, water, lead, platinum, clay, molybdenum, mercury, iridium, osmium, uranium, tungsten, titanium, nickel, carbon, similar metals, non-metals, or combinations thereof. In at least one example, the weighted insert may be formed of tungsten carbide.

In some embodiments, at least one sidewall 106*a*, 106*b*, 108*a*, 108*b* may include at least one air vent 122 (shown in sidewalls 108*a*, 108*b* in FIGS. 1, 4, and 5). Air vents 122 may be any suitable shape and may be present in any suitable number. As shown in FIG. 1, surface 110*a* may include at least one cavity 124 in fluid communication with at least one air vent or plurality of air vents 122. FIG. 6 shows a top view of cavities 608*a*, 608*b*. The air vent(s) 122 and corresponding cavities 608*a*, 608*b* may allow for cooling of the test device while in use, which may allow the test device to run for long testing durations and may help prevent overheating and/or damage to the test device.

The description above and examples are illustrative, and are not intended to be restrictive. One of ordinary skill in the art may make numerous modifications and/or changes without departing from the general scope of the invention. For example, and as has been referenced, aspects of above-described embodiments may be used in any suitable combination with each other. Additionally, portions of the above-described embodiments may be removed without departing from the scope of the invention. In addition, modifications may be made to adapt a particular situation or aspect to the teachings of the various embodiments without departing from their scope. Many other embodiments will also be apparent to those of skill in the art upon reviewing the above description.

What is claimed is:

1. A support holder for holding a test device, the support holder comprising:

a base having a first plurality of sidewalls, a second plurality of sidewalls and an opening into an interior of the base, wherein the first plurality of sidewalls includes a first sidewall and a second sidewall, the first sidewall including a first corner, a second corner and a center notch positioned between the first corner and the second corner, and wherein the second sidewall includes a movable portion configured to selectively cover the opening into the interior of the base in a closed state or to expose the opening into the interior of the base in an open state;

a cavity formed in the base including a surface configured to receive at least a portion of the test device; and a plurality of projections formed integrally with the base and extending away from the base, each projection of the plurality of projections including, a housing, a leg, and a neck disposed between the base and the housing.

2. The support holder of claim 1, wherein the opening extends at least partially through the interior of the base, from the first sidewall to the second sidewall.

3. The support holder of claim 1, wherein each sidewall of the first plurality of sidewalls has a first length between about 20 mm and 50 mm and each sidewall of the second plurality of sidewalls has a second length between about 90 mm and 130 mm.

4. The support holder of claim 1, wherein each sidewall of the first plurality of sidewalls and each sidewall of the second plurality of sidewalls has a thickness between about 6 mm and 8 mm.

5. The support holder of claim 1, wherein each sidewall of the first plurality of sidewalls and each sidewall of the second plurality of sidewalls has a height between about 20 mm and 30 mm.

6. The support holder of claim 1, wherein the center notch has a length between about 15 mm and 20 mm.

7. The support holder of claim 3, wherein the first corner and the second corner each have a height about 5 mm greater than a height of the second plurality of sidewalls.

8. The support holder of claim 1, further comprising a weighted insert disposed in the interior of the base.

9. The support holder of claim 8, wherein the weighted insert is formed of a substance selected from the group consisting of stainless steel, sand, water, lead, platinum, clay, molybdenum, mercury, iridium, osmium, uranium, tungsten, titanium, nickel, carbon, a non-metal or a combination thereof.

10. The support holder of claim 1, wherein the movable portion is completely removable from the base in the open state.

11. The support holder of claim 1, wherein the movable portion is slidable relative to the base to expose the opening into the interior of the base in the open state.

12. The support holder of claim 1, further comprising a hinge wherein the movable portion is connected to the base via the hinge.

13. A support holder for holding a test device, the support holder comprising:

a base having a first plurality of sidewalls and a second plurality of sidewalls, the first plurality of sidewalls and the second plurality of sidewalls defining a first cavity in the base, wherein the first cavity includes a surface configured to receive at least a portion of the test device;

a plurality of projections formed integrally with the base and extending away from the base, each projection of the plurality of projections including, a housing, a leg, and a neck disposed between the base and the housing, and wherein the leg has a first portion and the housing has a corresponding portion configured to receive the first portion of the leg; and one or more air vents configured to facilitate cooling of the test device when in use.

14. The support holder of claim 13, wherein the cavity is in fluid communication with the one or more air vents.

15. The support holder of claim 13, wherein the second plurality of sidewalls includes a first sidewall including a first air vent and the second plurality of sidewalls includes a second sidewall including a second air vent.

16. The support holder of claim 15, wherein the first cavity is in fluid communication with the first air vent and the support holder comprises a second cavity in fluid communication with the second air vent.

17. The support holder of claim 13, wherein each sidewall of the first plurality of sidewalls has a first length and each side wall of the second plurality of sidewalls has a second length, wherein the second length is greater than the first length.

18. The support holder of claim 13, wherein a the second plurality of sidewalls includes a first sidewall including a first pair of projections extending form the first sidewall and the second plurality of sidewalls includes a second sidewall including a second pair of projections extending form the second sidewall.

19. The support holder of claim 13, wherein the neck has a first height, the leg has a second height, wherein the second height is greater than the first height, and the neck is disposed between the leg and the base.

20. The support holder of claim 13, wherein the leg includes a nonslip material.

* * * * *